July 1, 1930.  G. L. LANG  1,769,029
VACUUM TUBE SOCKET
Filed March 13, 1925
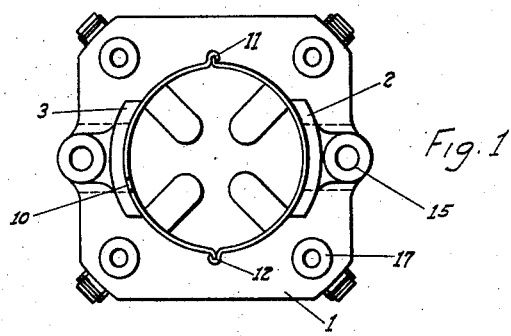
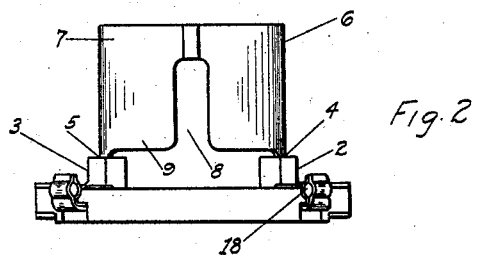
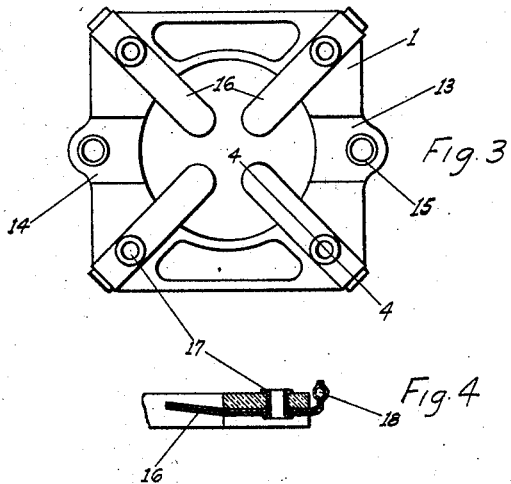
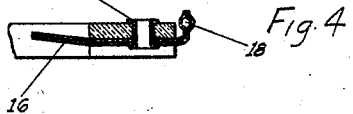
INVENTOR
GEORGE L. LANG
BY
*A. D. T. Libby*
ATTORNEY Patented July 1, 1930

1,769,029

UNITED STATES PATENT OFFICE

GEORGE L. LANG, OF SOUTH ORANGE, NEW JERSEY, ASSIGNOR TO SPLITDORF ELECTRICAL COMPANY, OF NEWARK, NEW JERSEY

VACUUM-TUBE SOCKET

Application filed March 13, 1925. Serial No. 15,190.

This invention relates to a socket especially adapted for use in mounting vacuum or radio tubes.

It is the principal object of my invention to provide a socket that will insure a good contact between the contact members of the socket and the terminals on the tube.

It is a further object of my invention to provide a socket which is extremely light, yet strong and durable, and one that is cheap to manufacture.

Another object of my invention is to provide a quick and ready means for attaching the connecting wires to the socket contact members.

Another object of my invention is to provide a socket having low loss characteristics with respect to radio currents.

These and other objects will be apparent to one skilled in this art after a study of the specification taken in connection with the annexed drawing, wherein Figure 1 is a plan view of the socket.

Figure 2 is a side elevation of Fig. 1.

Figure 3 is a bottom view of the socket and

Figure 4 is a section on the lines 4—4 of Fig. 3.

Referring now to the details wherein like numbers refer to corresponding parts in the various views, 1 is a base preferably formed of good, strong insulating material. Extending from the upper side of the base is a pair of arcuately formed flanges 2 and 3 which act as backing members or braces for the arms 4 and 5 of a tube support which is preferably made of metal and consisting of two parts 6 and 7. The parts 6 and 7 have oppositely disposed cut-away portions in the body of the socket and when the two parts, 6 and 7, are fastened together, these cut-away portions form a slot 8 thereby providing certain resilience at the points 9, which portions may be adjusted to give a gripping action on the tube so as to hold it securely in position, although, the body of the tube support is provided with the usual bayonet lock 10 to assist in holding the tube in position in the support. The parts 6 and 7 are locked together at 11 and 12 by crimping over the rim in the manner shown in Fig. 1. It is obvious that these parts 6 and 7 may be fastened together in any other satisfactory manner.

The flanges 2 and 3 are preferably provided with vertical grooves to receive the arms 4 and 5 of the tube support. The arms are bent over as indicated by the numbers 13 and 14 of Fig. 3 and lie in a pair of radial grooves in the bottom of the base 1, being held securely in position by eyelets 15 which are spun over thereby forming rivets. The bottom of the base 1 is also provided with additional grooves, radially spaced, and in these grooves are positioned a series of metallic members 16. Preferably, each of the members 16 is composed of a plurality, two being indicated, of resilient members of suitable material. The grooves receiving the members 16 are deep enough so that the members 16 are at a substantial distance below the bottom of the socket so as not to come in contact with any surface on which the socket base may be mounted. The members 16 are held in the grooves by eyelets 17 which are spun over thereby forming rivets passing entirely through the base member 1. The members 16 are substantially straight throughout most of their length although the ends toward the axial center of the socket may be formed slightly upward as indicated in Fig. 4. The extreme outer ends of the two members composing one of the contacts 16 are formed in opposite directions into the shape of an eyelet 18 which thus becomes a means for making a sliding atachment with a conductor. Usually, in the wiring of radio sets, bare conductors, referred to as bus-bars, are used and these bus-bars can be quickly connected to the socket by sliding them through the gripping eyelets 18. Of course, it is obvious that after the conductors are put in place, they may be soldered, although the soldering operation may, or may not be done as desired. Likewise, it is obvious that the eyelets may be quickly adjusted by a pair of pliers to any desired size. Consequently, it will be clearly apparent from what has been said that the details of this invention may be varied over quite an extent without departing from the spirit of my invention or the scope of the appended claims.

Having thus described my invention what I claim is:

1. In a device of the class described, a base of insulating material, a tube support fastened thereto, said support being constructed of two pieces locked together at the outer rim thereof, a series of metallic members fastened to the base and extending toward the axial center of the support, said metallic members being formed at their outer ends so as to slidably receive a conductor.

2. In a device of the class described, a base of insulating material, a tube support fastened thereto, said support being constructed of two pieces locked together at the outer rim thereof, and having arms projecting through the base and bent over the edge thereof for fastening the support to the base, a series of metallic members fastened to the base and extending toward the axial center of the support, said metallic members being formed at their outer ends so as to slidably receive a conductor.

3. In a device of the class described, a substantially flat base of insulating material having a pair of flanges extending from its upper surface with a plurality of radially extending grooves in its lower surface, a two part metallic socket, said parts being fastened together at their outer rim and having a pair of arms positioned against said flanges and bent over into one pair of said grooves and fastening means passing through the base and said bent over ends, a series of metallic members fastened in position within the other grooves, said metallic members having their outer ends formed to slidably receive a conductor.

4. In a device of the class described, a base of insulating material having grooves in the bottom thereof, a tube support composed of two similar metal pieces having opposite cut away portions in the periphery of the body of the support and being fastened together at the rim over said cut away portions, said support having a plurality of arms positioned in certain of said grooves for fastening the support to the base and a series of metallic members fastened in other of said grooves and extending toward the axial line of the tube support.

5. In a device of the class described, a base of insulating material, a metal tube support formed from two similar parts anchored together and each part having an arm fastened to the base, the body portion of the support being constructed so as to grip the tube and having a lock to assist in holding the tube in position, a series of metallic members fastened to the base and extending toward the axial line of the support and terminating adjacent the periphery of the base in adjustable eyelets for gripping a conductor.

In testimony whereof, I affix my signature.

GEORGE L. LANG.